United States Patent
Gmeiner et al.

(10) Patent No.: US 10,220,413 B2
(45) Date of Patent: Mar. 5, 2019

(54) CONVERTER UNIT

(71) Applicant: Hermann Ultraschalltechnik GmbH & Co. KG, Karlsbad (DE)

(72) Inventors: Josef Gmeiner, Weiherhammer (DE); Thorsten Faustka, Marxzell (DE); Ulrich Vogler, Uhldingen-Muhlhofen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 276 days.

(21) Appl. No.: 15/109,781

(22) PCT Filed: Jan. 15, 2015

(86) PCT No.: PCT/EP2015/050690
§ 371 (c)(1),
(2) Date: Jul. 5, 2016

(87) PCT Pub. No.: WO2015/110347
PCT Pub. Date: Jul. 30, 2015

(65) Prior Publication Data
US 2016/0325312 A1    Nov. 10, 2016

(30) Foreign Application Priority Data

Jan. 24, 2014    (DE) .................. 10 2014 100 817

(51) Int. Cl.
*B32B 37/00*    (2006.01)
*B06B 3/00*    (2006.01)
*B23K 20/10*    (2006.01)

(52) U.S. Cl.
CPC .............. *B06B 3/00* (2013.01); *B23K 20/106* (2013.01)

(58) Field of Classification Search
CPC .. B06B 1/06; B06B 3/00; B29C 65/08; B29C 65/087
(Continued)

(56) References Cited

U.S. PATENT DOCUMENTS

| | | |
|---|---|---|
| 3,696,259 A | 10/1972 | Mori |
| 4,500,272 A | 2/1985 | Astier |
| 6,547,903 B1 | 4/2003 | McNichols et al. |
| 7,108,764 B2 | 9/2006 | Schneider |
| 8,082,966 B2 * | 12/2011 | Short .................. B23K 20/103 156/580.1 |

(Continued)

FOREIGN PATENT DOCUMENTS

| | | |
|---|---|---|
| DE | 1810406 A1 | 7/1969 |
| DE | 2007/079796 A | 7/2007 |

(Continued)

OTHER PUBLICATIONS

Japanese Patent Application No. 2016-547021, Notification of Reasons for Rejection (Japanese and English Translation).

(Continued)

*Primary Examiner* — James D Sells
(74) *Attorney, Agent, or Firm* — Paul & Paul

(57) ABSTRACT

The present invention concerns a converter unit comprising an ultrasonic transmission element having a transmission surface for transmitting an ultrasonic vibration to a tool which can be fixed to the transmission surface or to a material which is in contact therewith in the longitudinal direction along a longitudinal axis of the ultrasonic transmission element, and at least one ultrasonic transducer for generating an ultrasonic vibration with a propagation direction which is not oriented along the longitudinal direction, wherein the converter unit has an ultrasonic natural frequency. To provide a converter unit having an ultrasonic transmission element which has a transmission surface for (Continued)

Figure 1:
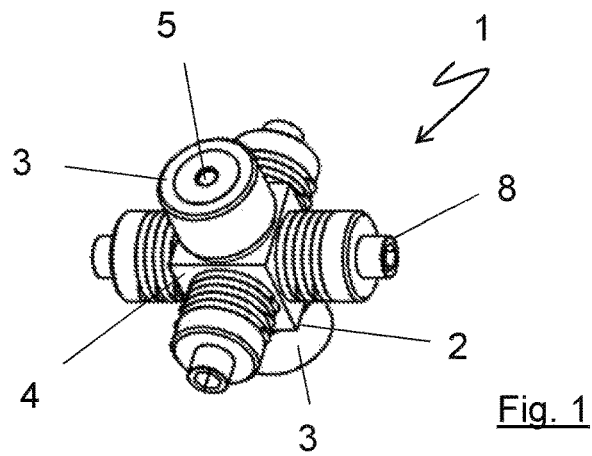

transmitting an ultrasonic vibration to a tool which can be fixed to the transmission surface or to a material which is in contact therewith in the longitudinal direction along a longitudinal axis of the ultrasonic transmission element and at least one ultrasonic transducer for generating an ultrasonic vibration with a propagation direction which is not oriented along the longitudinal direction, wherein the converter unit has an ultrasonic natural frequency with which a high vibration energy can be generated, it is proposed according to the invention that the ultrasonic transducer is arranged in the propagation direction in a region of $\pm\lambda/4$ about the longitudinal axis of the ultrasonic transmission element, wherein $\lambda$ is the wavelength of the vibration belonging to the ultrasonic natural frequency.

18 Claims, 8 Drawing Sheets

(58) Field of Classification Search
USPC .................................................. 156/580.1
See application file for complete search history.

(56) References Cited

U.S. PATENT DOCUMENTS

| | | | |
|---|---|---|---|
| 9,296,255 | B2 | 3/2016 | Vogler et al. |
| 2003/0168938 | A1 | 9/2003 | Wallaschek et al. |
| 2011/0042014 | A1* | 2/2011 | Vogler ................ B23K 20/106 |
| | | | 156/580.1 |

FOREIGN PATENT DOCUMENTS

| | | |
|---|---|---|
| DE | 602 24 088 T2 | 11/2008 |
| EP | 1 514 670 A2 | 3/2005 |
| JP | H03-047723 A | 9/1992 |
| JP | H06 15346 A | 5/1994 |
| JP | H11 87437 A | 3/1999 |

OTHER PUBLICATIONS

Agnes Wittmann-Regis, International Preliminary Examination Report on Patentability, International Bureau of WIPO, PCT/EP2015/050690, pp. 1-13 (English translation).

* cited by examiner

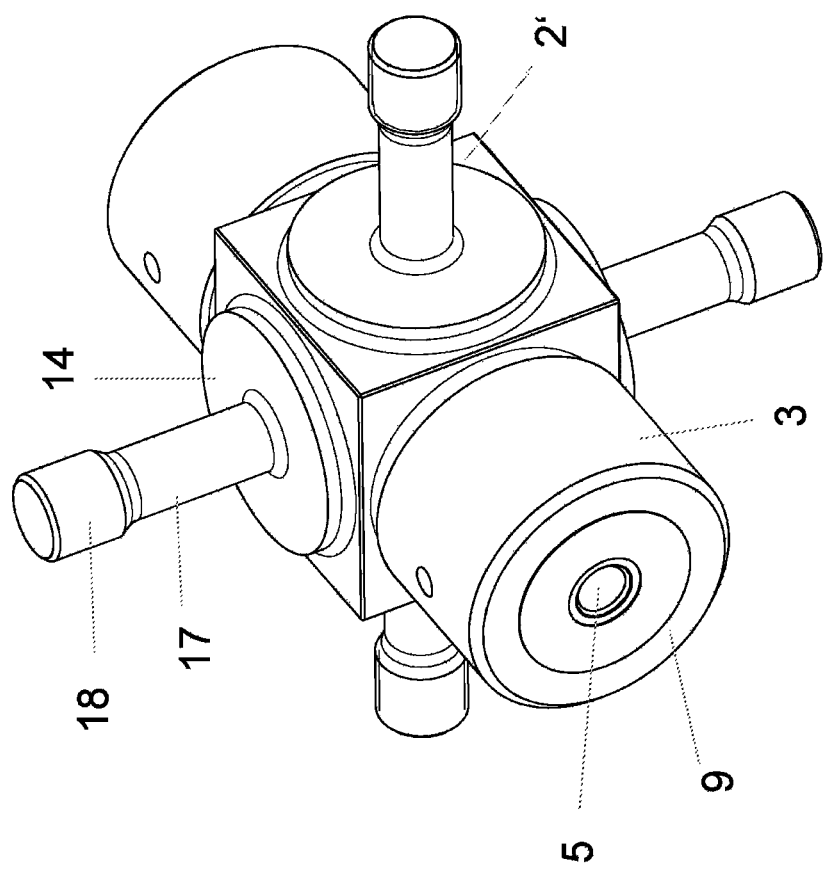

CONVERTER UNIT

CROSS-REFERENCE TO RELATED APPLICATION

This application is a 371 national stage application of International Application PCT/EP2015/050690, filed Jan. 15, 2015, and claims the priority of German Application No. 10 2014 100 817.0, filed on Jan. 24, 2014.

The present invention concerns a converter unit and an ultrasonic vibration unit having such a converter unit.

Ultrasonic processing of materials is acquiring an ever increasing significance in particular in the packaging technology.

Thus for example EP 1 514 670 A2 discloses an apparatus for continuously joining and/or reinforcing material webs by means ultrasound, in which a sonotrode in the form of a rotating roller is arranged at a radially oppositely disposed counterpart tool, and in which material webs are passed through between the sonotrode and the counterpart tool for continuous reinforcement and/or joining thereof. The sonotrode is excited with an ultrasonic vibration by means of an ultrasonic converter which is axially fitted by way of an amplitude transformation portion. The ultrasonic converter which generally has suitable piezoelectric elements converts an electrical ac voltage into a mechanical vibration. The ultrasonic vibration unit comprising the sonotrode, the amplitude transformation portion and the converter are so matched to each other that, when the ultrasonic converter is supplied with an ac voltage involving the natural frequency of the sonotrode, a resonance vibration is produced.

If for example two material webs are simultaneously moved through between the sonotrode and the counterpart tool and the sonotrode is pressed on to the counterpart tool with a predetermined force then the ultrasonic vibration is transmitted to the material webs and local heating and possibly welding of the material webs occurs in the region of the interface between the material webs.

Ultrasonic processing ensures that energy is applied substantially only in the region which has to be heated for making the join or producing the weld. Consequently very energy-saving material processing can be implemented by means of ultrasonic processing.

Therefore there is a need for ever more powerful ultrasonic processing devices. For that purpose the above-described sonotrodes in the form of a rotating roller are of an ever increasing size and the material web speed is increased more and more. In addition the aim is to weld thicker and thicker material webs by means of ultrasound. The consequence of this however is that the sonotrode has to transmit an ever increasing level of power. To achieve that the welding force, that is to say the force with which the sonotrode is pressed on to the material web, has to be increased, which in turn results in an increased vibration damping effect and thus a reduction in the vibration amplitude.

In order to keep the vibration amplitude of the sonotrode constant in spite of the increased damping for example the ac voltage amplitude and/or the ac amplitude can be increased at the converter. It will be noted however that this is possible only to a certain degree as piezoelectric elements present a maximum extent at a limit voltage. In addition piezoelectric elements exhibit higher electrical losses at high voltages and/or currents.

A further measure for keeping the mechanical vibration amplitude constant with a higher welding force can involve using a larger number of piezo disks. It will be noted however that the piezo disks are of a finite extent and their positioning within the ultrasonic vibration structure can be effected only within a relatively narrow range in the proximity of a vibration maximum of the standing wave.

Therefore the attempt has also already been made to connect a plurality of converters which each have a respective piezo stack to a sonotrode. It will be noted however that a high level of complication and expenditure in terms of regulation technology is necessary here to suitably synchronize the two converters.

DE 18 10 406 already describes an apparatus for distributing vibration energy, which has a plurality of transmission elements which are connected together in substantially right-angled relationship. Arranged at the end faces of some elements are transducers which excite the transmission elements. The development and manufacture of such transmission elements is however complicated and laborious. Furthermore additional vibration modes are produced by the relatively large extent of the apparatus in a transverse direction and in particular the arrangement of the converters at a relatively large spacing with respect to the longitudinal axis. Those additional vibration modes are substantially unwanted bending modes which however are also excited in operation and therefore lead to a higher mechanical loading on the transducers and an unwanted heating effect and thus an increased energy loss in the system so that such transmission elements have not prevailed.

Taking the described state of the art as the basic starting point therefore the object of the present invention is to provide a converter unit having an ultrasonic transmission element which has a transmission surface for transmitting an ultrasonic vibration to a tool which can be fixed to the transmission surface or to a material which is in contact therewith in the longitudinal direction along a longitudinal axis of the ultrasonic transmission element and at least one ultrasonic transducer for producing an ultrasonic vibration with a propagation direction which is not oriented along the longitudinal direction, wherein the converter unit has an ultrasonic natural frequency with which a high vibration energy can be generated.

According to the invention that object is attained in that the ultrasonic transducer is arranged in the propagation direction in a region of $\pm\lambda/4$ about the longitudinal axis of the ultrasonic transmission element, wherein $\lambda$ is the wavelength of the vibration belonging to the ultrasonic natural frequency.

When reference is made in the present application to an ultrasonic natural frequency of an element this means the lowest natural frequency of that element, that corresponds to a longitudinal vibration in the longitudinal direction.

In other words the converter unit according to the invention exploits the fact that the vibration structure which is formed within the ultrasonic vibration unit has a longitudinal vibration component which is used for exciting the sonotrode and a transverse vibration component. The converter is therefore used not for generating the longitudinal vibration that is actually wanted but for generating the rather unwanted but inevitable transverse vibration. In the resonance situation therefore a standing longitudinal wave is formed both in the longitudinal direction and also in the transverse direction. While in the longitudinal direction that is substantially a flat longitudinal wave it is substantially a cylindrical wave that is formed in the transverse direction.

The converter unit is then designed in such a way that the ultrasonic transducer is arranged in the propagation direction in a region within the central resonance half-wave of $\lambda/2$. In that case the ultrasonic transducer is arranged not on the longitudinal axis but spaced therefrom.

In that case preferably the ultrasonic transducer is so arranged that the propagation direction and the longitudinal axis intersect at a point which is substantially at a vibration node both for the longitudinal vibration and also for the transverse vibration.

A particularly preferred embodiment is one in which there are provided at least two ultrasonic transducers which are so arranged that the ultrasonic waves generated by the at least two ultrasonic transducers respectively have a propagation direction which is not parallel to the longitudinal direction, wherein preferably the at least two ultrasonic transducers are respectively arranged in their propagation direction in a region of $\pm\lambda/4$ about the longitudinal axis of the ultrasonic transmission element.

In that respect the propagation direction advantageously extends perpendicularly to the longitudinal direction. In principle it is admittedly possible for the ultrasonic transducer to be so arranged that it produces an ultrasonic wave which is not perpendicular to the longitudinal direction. In general however that results in a non-optimum resonance vibration in the converter unit. A perpendicular arrangement is therefore of advantage. By virtue of using at least two ultrasonic transducers which as far as possible are arranged in axis-symmetrical relationship with the longitudinal axis the transverse wave can be uniformly excited, this leading to the desired longitudinal vibration by virtue of the material properties.

In a preferred embodiment there is an even number of ultrasonic transducers, wherein two ultrasonic transducers are always arranged on opposite sides of the longitudinal axis. Advantageously there are four ultrasonic transducers which are each spaced from each other through 90° respectively in the peripheral direction.

In that respect it is advantageous if the converter unit has a transverse extent of about $\lambda/2$ in the propagation direction.

In a preferred embodiment the converter unit has a substantially cube-shaped base portion and at least one longitudinal arm extending in the longitudinal direction and four transverse arms extending in the transverse direction, wherein the at least one longitudinal arm and the transverse arms are fixed to the base portion, wherein the transverse arms each have a respective ultrasonic transducer. Particularly preferably there are provided two longitudinal arms extending in the longitudinal direction. The sonotrode to be excited can then be fixed on one of the longitudinal arms.

In a further preferred embodiment the converter unit is of a length of about $\lambda/2$ both in the transverse direction and also in the longitudinal direction.

For example the cube-shaped base portion can have in the transverse direction a threaded bore to which the ultrasonic transducer can be screwed. It will be noted however that, particularly when higher vibration amplitudes are involved considerable stresses can occur in the material in the region of the threaded bore, whereby the screw connection can be heavily loaded and even damaged. In a particularly preferred embodiment it is therefore provided that the ultrasonic transmission element, that is to say for example the cube-shaped base portion, has at least one holding pin which is shaped thereon in one piece and which engages through an opening in the ultrasonic generating means. The one-piece connection excludes fatigue of or damage to a screwed connection.

The present invention also concerns an ultrasonic vibration unit having a rotatable sonotrode which is preferably in the form of a rotating roller. To excite such a sonotrode it is proposed according to the invention that the described converter unit is fitted to the rotatable sonotrode axially, optionally by way of one or more amplitude transformation portions. The use of a plurality of amplitude transformation portions is described for example in WO 2007/079796.

If the ultrasonic energy to be transmitted should not suffice it is also possible for two of the described converter units to be axially fitted, in which case preferably the two converter units are fitted on opposite sides of the sonotrode.

Figure 2:
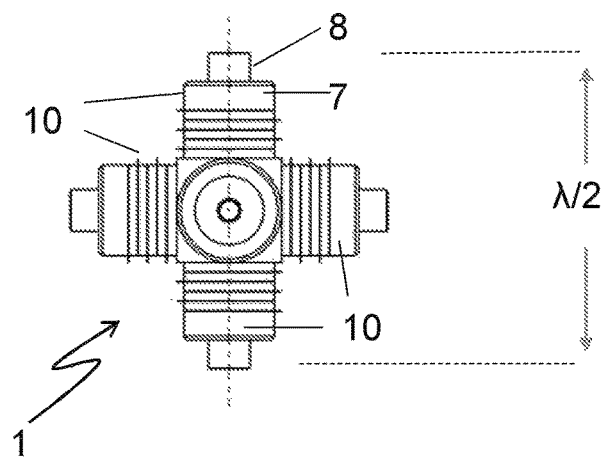
Figure 3:
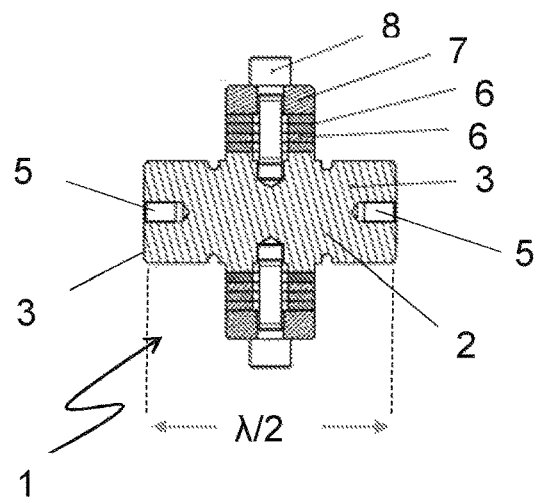
Figure 4:
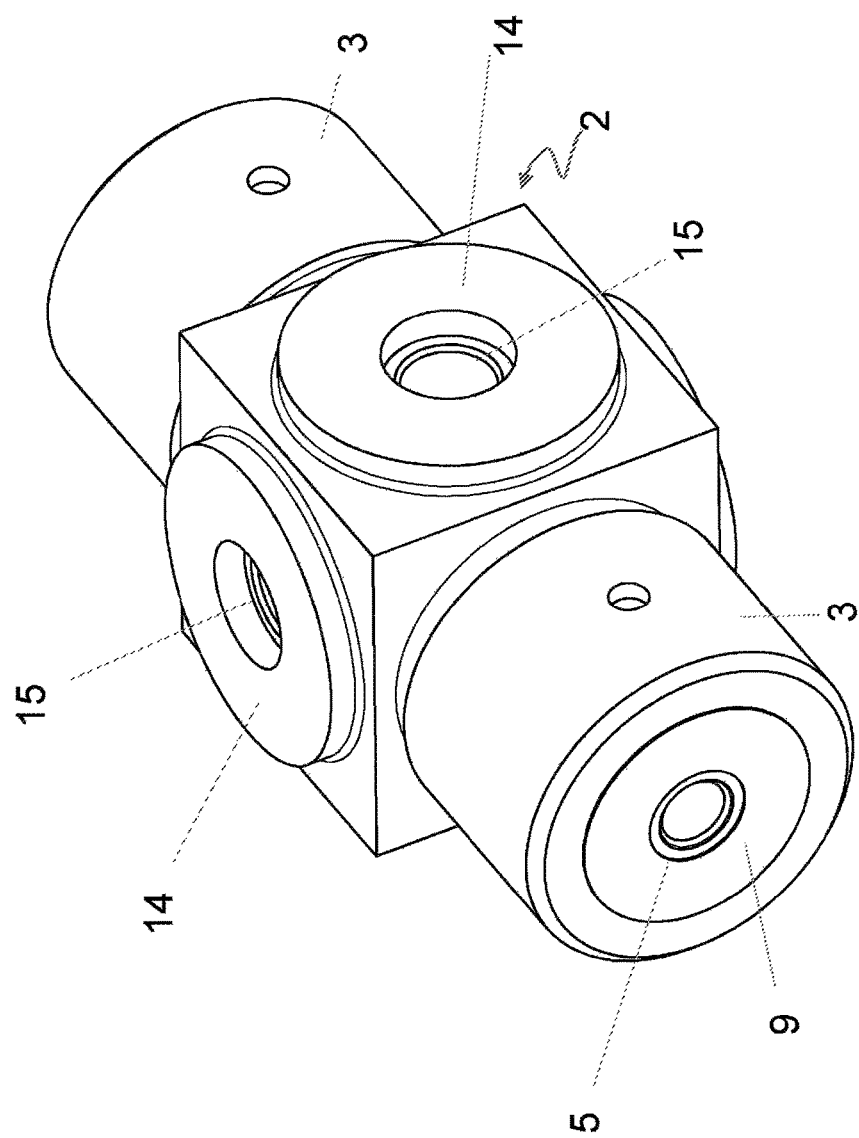
Figure 7:
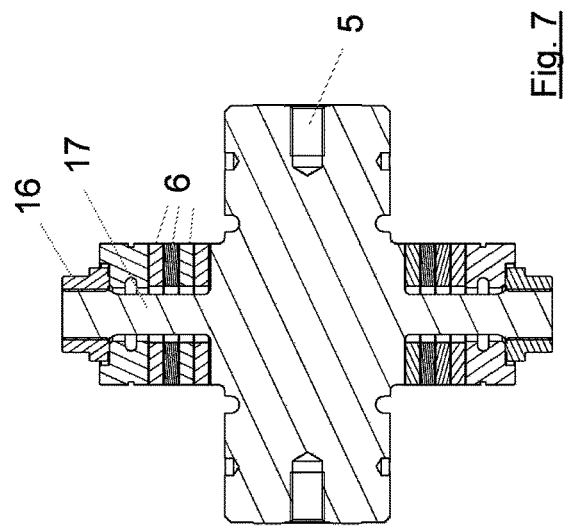
Figure 6:
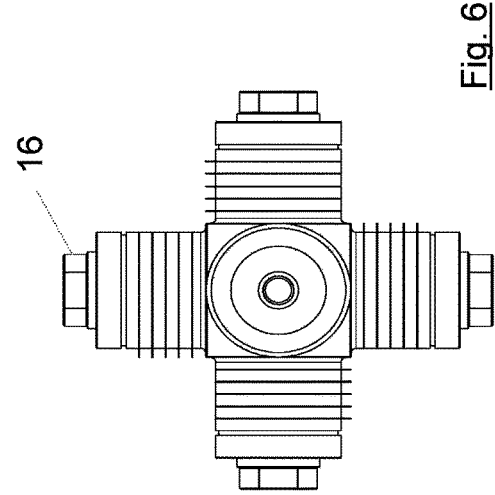
Figure 5:
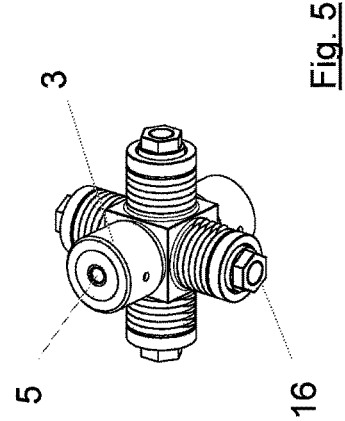
Figure 9:
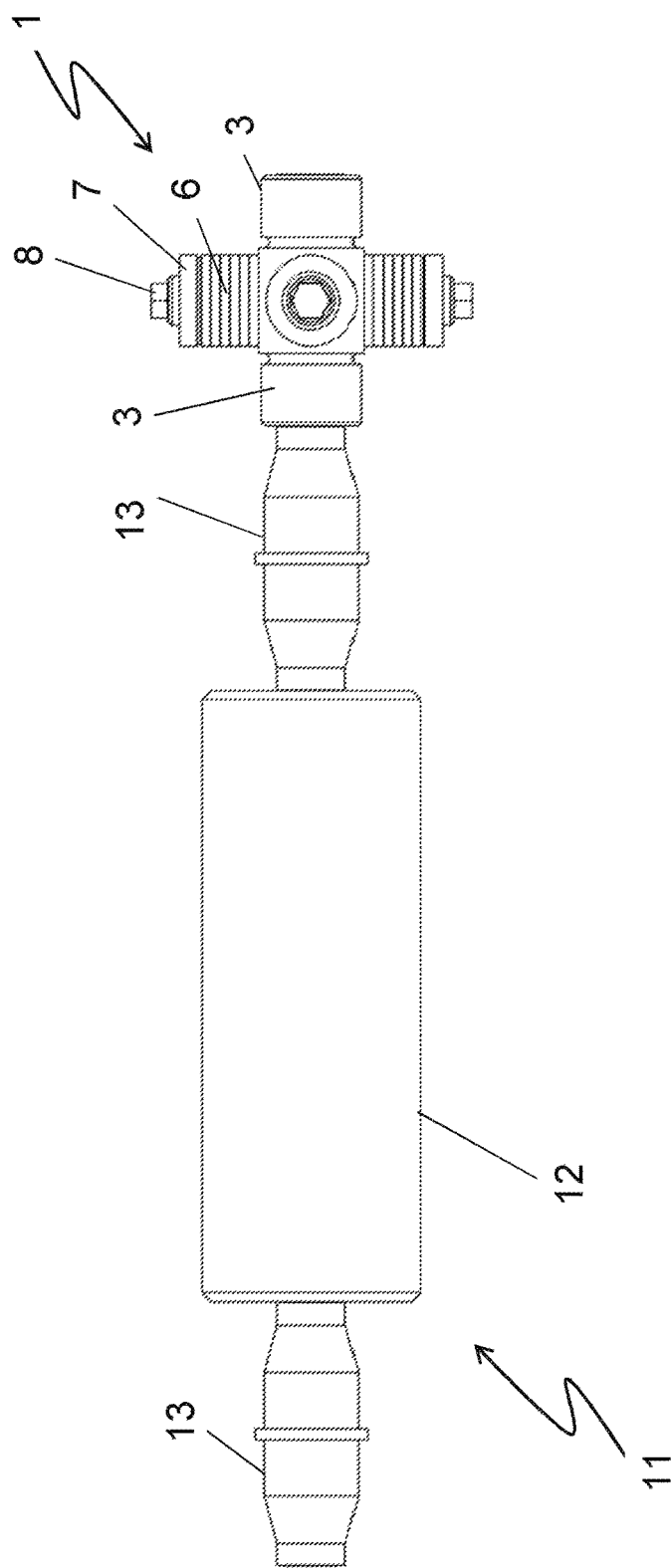
Figure 10:
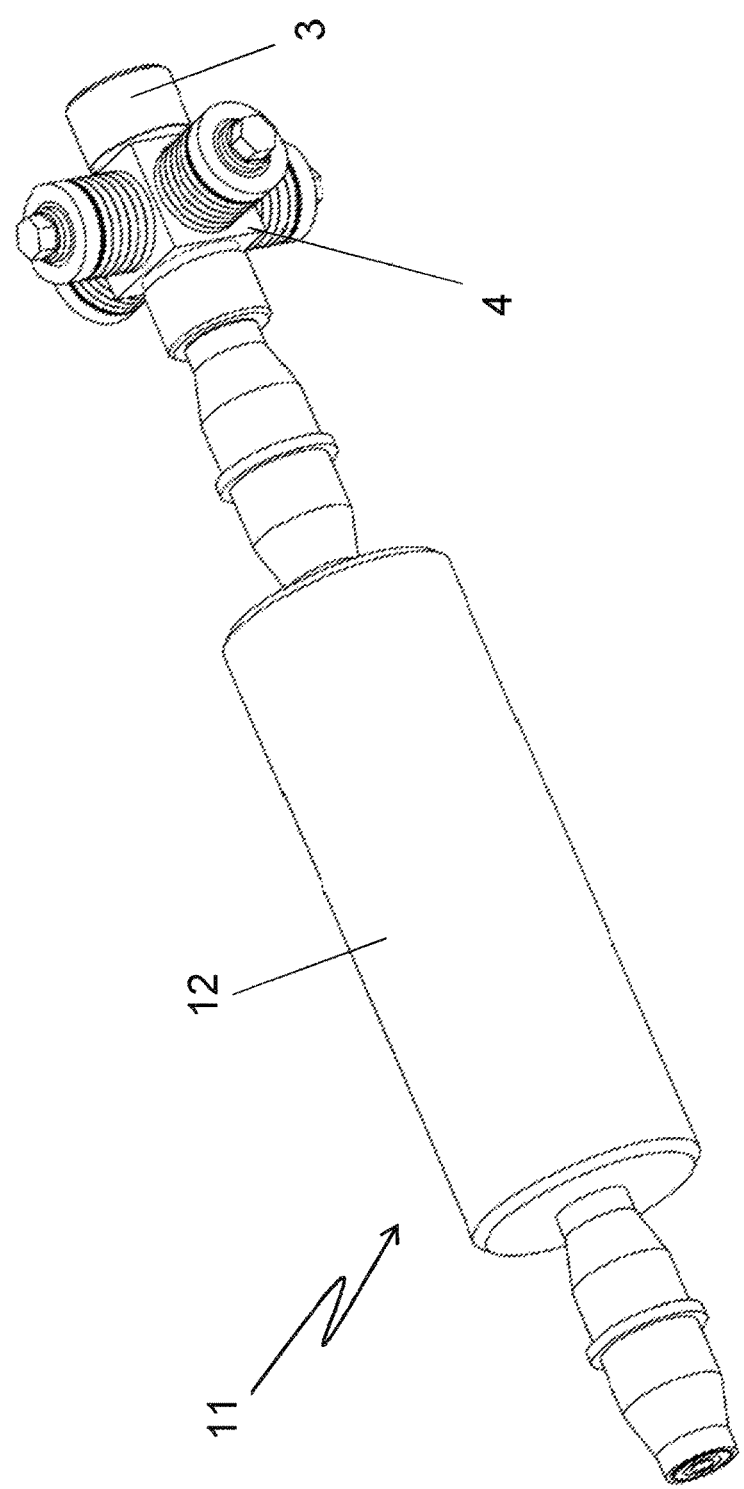
Figure 11:
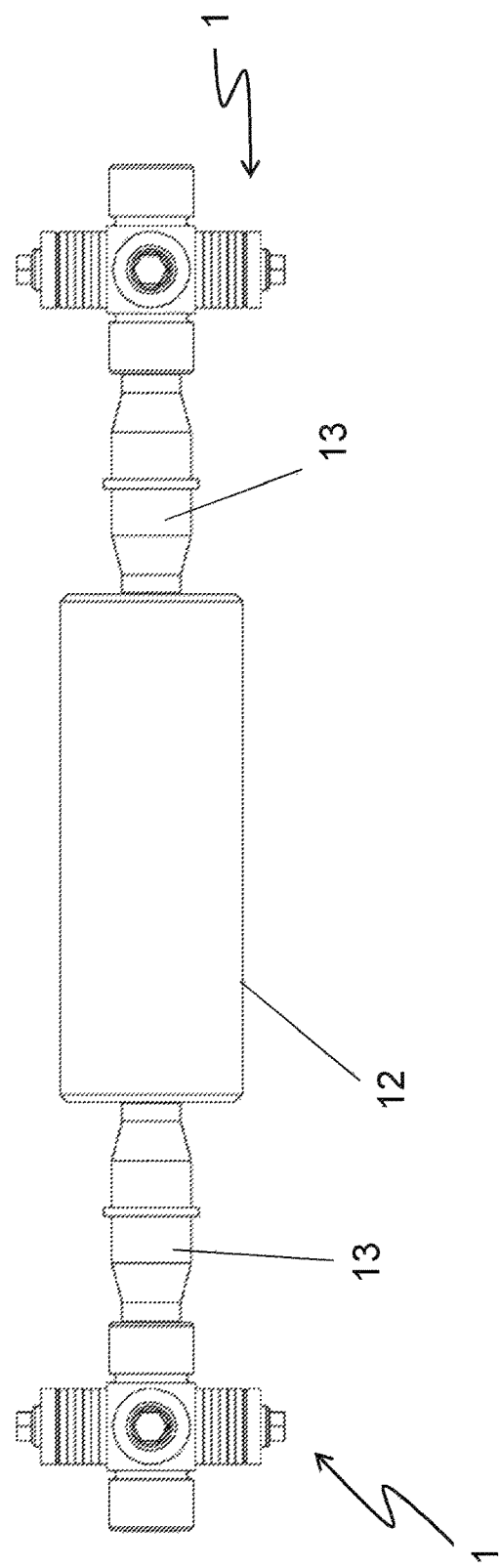
Figure 12:
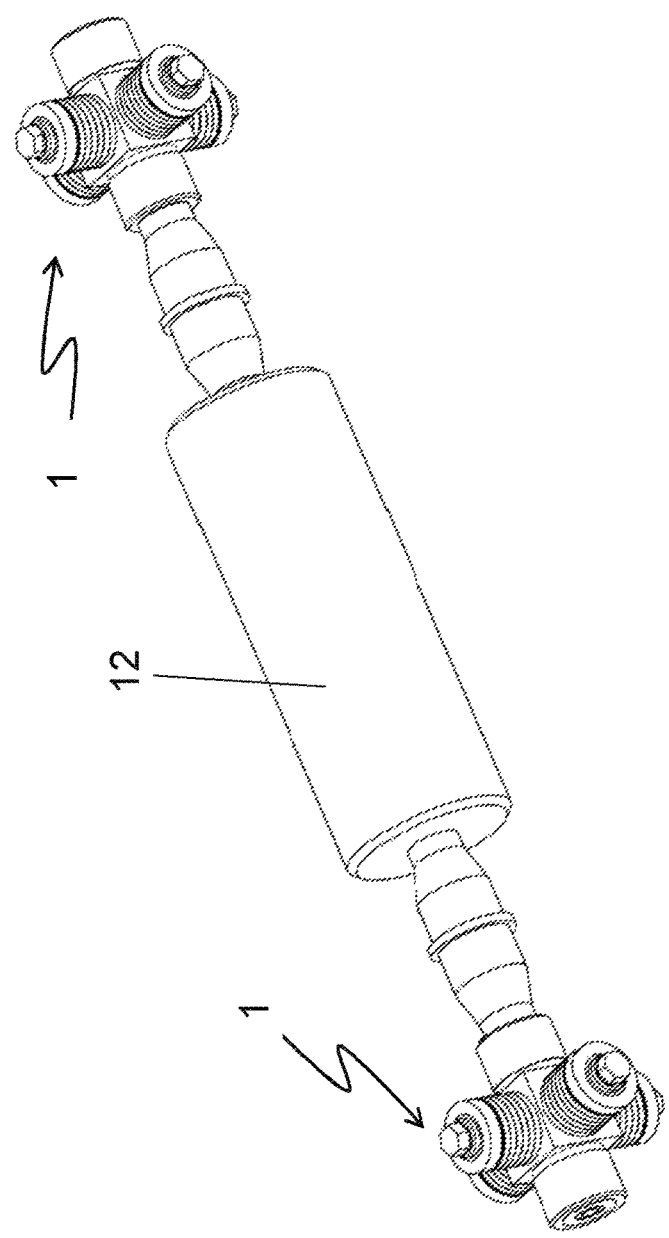

Further advantages, features and possible uses of the present invention will be apparent from the following description of some embodiments and the accompanying Figures in which:

FIG. 1 shows a perspective view of a first converter unit according to the invention, FIG. 2 shows a plan view in the longitudinal direction of the converter unit of FIG. 1, FIG. 3 shows a view in longitudinal section of the converter unit of FIG. 1, FIG. 4 shows a perspective view of the ultrasonic transmission element of the embodiment of FIG. 1, FIG. 5 shows a perspective view of a second converter unit according to the invention, FIG. 6 shows a plan view in the longitudinal direction of the converter unit of FIG. 5, FIG. 7 shows a view in longitudinal section of the converter unit of FIG. 5, FIG. 8 shows a perspective view of the ultrasonic transmission element of the embodiment of FIG. 5, FIG. 9 shows a plan view of a first embodiment according to the invention of an ultrasonic vibration unit, FIG. 10 shows a perspective view of the embodiment of FIG. 9, FIG. 11 shows a plan view of a second embodiment of an ultrasonic vibration unit according to the invention, and FIG. 12 shows a perspective view of the embodiment of FIG. 11.

FIGS. 1 through 3 show various views of a converter unit 1 according to the invention. The converter unit 1 has an ultrasound-transmitting element 2 which comprises a cube-shaped base portion 4 and two arms 3 extending in the longitudinal direction. The arms 3 extending in the longitudinal direction are of a cylindrical configuration and in their end faces have respective threaded bores 5 serving for fixing tools like for example a sonotrode. The ultrasound-transmitting element 2 is to be acted upon with a longitudinal ultrasonic vibration at least at the end face at which the tool to be excited is fixed. In the resonance situation therefore a vibration maximum is formed at the end faces while a vibration node of the longitudinal vibration is produced in the center point of the ultrasound-transmitting element 2.

FIG. 4 shows a perspective view of the ultrasound-transmitting element 2. It is possible to see the two longitudinal arms 3 which extend from a cube-shaped main body and of which one has the transmission surface 9 and a threaded bore 5 for fixing to a sonotrode or an amplitude transformation member. Formed in one piece on the cube-shaped main body are four contact surfaces 14 for ultrasonic transducers, into each of which is let a respective threaded bore 15 into which the screws 8 can engage for fixing the piezo disks 6.

Even if generally only the longitudinal vibration is of interest, it is an inherent property of any vibration element that linked to the longitudinal vibration is a transverse vibration which extends substantially perpendicularly thereto.

That linkage is put to use in accordance with the invention. For that purpose the ultrasound-transmitting element 2 has four ultrasonic transducers 10 which each include piezo disks 6, an end disk 7 and a fixing screw 8. The piezo disks 6 are fixed together with an end disk 7 by means of fixing screws 8 to the surfaces, oriented in the transverse direction, of the cube-shaped base portion 4 of the ultrasound-transmitting element 2.

A transverse vibration can thus be generated in the converter unit by means of the ultrasonic transducer 10. In that respect the converter unit is so sized that in the resonance situation a standing transverse wave is produced, which produces a vibration node substantially on the longitudinal axis at the center point of the converter unit while a vibration maximum is produced at the end faces of the arms which are oriented in the transverse direction. As can be seen in FIG. 2 therefore the converter unit is of an extent of $\lambda/2$ in the transverse direction, wherein $\lambda$ is the wavelength of the transverse resonance vibration.

Just as a longitudinal vibration is inherently linked to an actually unwanted transverse vibration the generation of a transverse vibration also leads to a longitudinal vibration, and that is put to use in accordance with the invention.

Although therefore all converter units 10 together generate a cylindrical wave in the transverse direction, a flat longitudinal vibration is generated in the ultrasound-transmitting element 2. By virtue of the arrangement of the ultrasonic transducers in a region within the central resonance half-wave of $\lambda/2$, the energy loss is also minimized by virtue of the excitation of the transverse vibration.

FIGS. 5 through 7 show various views of a second embodiment of a converter unit according to the invention. FIG. 8 shows a perspective view of the ultrasound-transmitting element 2' of the second embodiment.

The second embodiment differs from the first embodiment only in that holding pins 17 which are shaped in one piece on the ultrasound-transmitting element 2' and which have a portion having a male thread 18 are used for fixing the piezo disks 6 to the ultrasound-transmitting element 2'. The piezo disks 6 are pushed over the holding pins 17 and fixed to the ultrasound-transmitting element 2' by means of a fixing nut 16. A screwed connection is avoided by virtue of the one-piece connection between holding pins 17 on the one hand and the ultrasound-transmitting element 2'. Particularly when high vibration amplitudes are involved the material stressing in the regions at which the holding pins are connected to the ultrasound-transmitting element 2' are very great, which in the case of screwed connections can result in a high stress on the screw connection.

FIGS. 9 and 10 show two views of a first embodiment of an ultrasonic vibration unit 11 according to the invention. This comprises a sonotrode 12, 13 which has a roller-shaped portion 12 and two axially fitted portions 13. Arranged at one of the two axially fitted portions 13 is a converter unit 1 as has been described in relation to FIGS. 1 through 3.

FIGS. 11 and 12 show two views of a second embodiment according to the invention of an ultrasonic vibration unit. This differs from the embodiment shown in FIGS. 9 and 10 in that two converter units 1 are arranged at axially opposite ends of the sonotrode at the axial connecting portions 13, whereby ultrasonic excitation of greater energy can be produced.

LIST OF REFERENCES 1 converter unit
2, 2' ultrasound-transmitting element
3 arms
4 base portion
5 threaded bores
6 piezo disks
7 end disk
8 fixing screws
9 transmission surface
10 ultrasonic transducer
11 ultrasonic vibration unit
12 roller-shaped portion of the sonotrode
13 axial connecting portion of the sonotrode
14 contact surface
15 threaded bore of the contact surface
16 fixing nut
17 holding pin
18 male thread

The invention claimed is:

1. A converter unit comprising an ultrasonic transmission element having a transmission surface for transmitting an ultrasonic vibration to a tool which can be fixed to the transmission surface or to a material which is in contact therewith in the longitudinal direction along a longitudinal axis of the ultrasonic transmission element, and at least one ultrasonic transducer for generating an ultrasonic vibration with a propagation direction which is not oriented along the longitudinal direction, wherein the converter unit has an ultrasonic natural frequency, characterised in that the ultrasonic transducer is arranged in the propagation direction in a region of $\pm\lambda/4$ about the longitudinal axis of the ultrasonic transmission element, wherein $\lambda$ is the wavelength of the vibration belonging to the ultrasonic natural frequency.

2. A converter unit as set forth in claim 1 characterised in that there are provided at least two ultrasonic transducers which are so arranged that the ultrasonic waves generated by the at least two ultrasonic transducers respectively have a propagation direction which is not parallel to the longitudinal direction, wherein preferably the at least two ultrasonic transducers are respectively arranged in their propagation direction in a region of $\pm\lambda/4$ about the longitudinal axis of the ultrasonic transmission element.

3. A converter unit as set forth in claim 1 characterised in that the propagation direction extends perpendicularly to the longitudinal direction.

4. A converter unit as set forth in claim 2 characterised in that there are provided an even number of ultrasonic transducers, wherein there are always two ultrasonic transducers arranged symmetrically relative to the longitudinal axis.

5. A converter unit as set forth in claim 1 characterised in that at least one ultrasonic transducer is so arranged that the propagation direction and the longitudinal axis intersect at a point which is substantially at a vibration node both for the longitudinal vibration and also for the transverse vibration.

6. A converter unit as set forth in claim 1 characterised in that the unit in the propagation direction has a transverse extent of about $\lambda/2$.

7. A converter unit as set forth in claim 1 characterised in that the converter unit has a substantially cube-shaped base portion and at least one longitudinal arm extending in the longitudinal direction and four transverse arms extending in the transverse direction, wherein the at least one longitudinal arm and transverse arms are fixed to the base portion, wherein the transverse arms each have a respective ultrasonic transducer.

8. A converter unit as set forth in claim 7 characterised in that the converter unit is of a length of less than or equal to $\lambda/2$ both in the transverse direction and also in the longitudinal direction.

9. A converter unit as set forth in claim 1 characterised in that the ultrasonic transmission element has at least one holding pin which is shaped in one piece thereon and which engages through an opening in the ultrasonic transducer.

10. An ultrasonic vibration unit having a rotatable sonotrode and at least one converter unit which is axially fitted to the sonotrode, the at least one converter unit comprising an ultrasonic transmission element having a transmission surface for transmitting an ultrasonic vibration to a tool which can be fixed to the transmission surface or to a material which is in contact therewith in the longitudinal direction along a longitudinal axis of the ultrasonic transmission element, and at least one ultrasonic transducer for generating an ultrasonic vibration with a propagation direction which is not oriented along the longitudinal direction, wherein the at least one converter unit has an ultrasonic natural frequency, characterised in that the ultrasonic transducer is arranged in the propagation direction in a region of $\pm\lambda/4$ about the longitudinal axis of the ultrasonic transmission element, wherein $\lambda$ is the wavelength of the vibration belonging to the ultrasonic natural frequency.

11. An ultrasonic vibration unit as set forth in claim 10 characterised in that two converter units are axially fitted.

12. A converter unit as set forth in claim 6 wherein preferably all ultrasonic transducers are so arranged that all their propagation directions and the longitudinal axis intersect at a point which is substantially at a vibration node both for the longitudinal direction and also for the transverse direction.

13. A converter unit as set forth in claim 2 characterised in that the propagation direction extends perpendicularly to the longitudinal direction.

14. A converter unit as set forth in claim 3 characterised in that there are provided an even number of ultrasonic transducers, wherein there are always two ultrasonic transducers arranged symmetrically relative to the longitudinal axis.

15. A converter unit as set forth in claim 7 wherein the converter unit is provided two longitudinal arms extending in the longitudinal direction.

16. A converter unit as set forth in claim 8 wherein the length is $\lambda/2$ both in the transverse direction and also in the longitudinal direction.

17. An ultrasonic vibration unit according to claim 10 wherein the rotatable sonotrode is in the form of a rotating roller.

18. An ultrasonic vibration unit according to claim 10 wherein the at least one converter unit is axially fitted to the sonotrode by way of an amplitude transformation portion.

* * * * *

UNITED STATES PATENT AND TRADEMARK OFFICE
CERTIFICATE OF CORRECTION

| | | |
|---|---|---|
| PATENT NO. | : 10,220,413 B2 | Page 1 of 1 |
| APPLICATION NO. | : 15/109781 | |
| DATED | : March 5, 2019 | |
| INVENTOR(S) | : Gmeiner et al. | |

It is certified that error appears in the above-identified patent and that said Letters Patent is hereby corrected as shown below:

On the Title Page

Change the spelling of the Applicant to read as follows: Herrmann Ultraschalltechnik GmbH & Co. KG Signed and Sealed this
Fourteenth Day of May, 2019

Andrei Iancu
*Director of the United States Patent and Trademark Office*